(12) United States Patent
Aarabi

(10) Patent No.: US 10,679,626 B2
(45) Date of Patent: Jun. 9, 2020

(54) GENERATING INTERACTIVE AUDIO-VISUAL REPRESENTATIONS OF INDIVIDUALS

(71) Applicant: Pegah Aarabi, Richmond Hill (CA)

(72) Inventor: Pegah Aarabi, Richmond Hill (CA)

(*) Notice: Subject to any disclaimer, the term of this patent is extended or adjusted under 35 U.S.C. 154(b) by 0 days.

(21) Appl. No.: 16/150,103

(22) Filed: Oct. 2, 2018

(65) Prior Publication Data

US 2020/0035234 A1 Jan. 30, 2020

Related U.S. Application Data

(60) Provisional application No. 62/702,538, filed on Jul. 24, 2018.

(51) Int. Cl.

| G10L 15/22 | (2006.01) |
|---|---|
| G10L 15/18 | (2013.01) |
| G06N 20/00 | (2019.01) |
| G06F 16/48 | (2019.01) |
| G10L 15/08 | (2006.01) |

(52) U.S. Cl.
CPC ............. *G10L 15/22* (2013.01); *G06F 16/48* (2019.01); *G06N 20/00* (2019.01); *G10L 15/1815* (2013.01); *G10L 2015/088* (2013.01); *G10L 2015/223* (2013.01)

(58) Field of Classification Search
CPC ..... G06F 16/7844; G06F 16/48; G10L 15/22; G10L 15/1815; G10L 2015/025; G10L 2015/088; G10L 2015/223; G10L 2021/105; G10L 21/10; G06N 20/00
See application file for complete search history.

(56) References Cited

U.S. PATENT DOCUMENTS

| 6,735,566 | B1 * | 5/2004 | Brand | G06K 9/6297 345/473 |
|---|---|---|---|---|
| 7,272,558 | B1 * | 9/2007 | Soucy | G10L 15/063 704/235 |
| 8,527,520 | B2 * | 9/2013 | Morton | G06F 16/31 707/746 |
| 8,713,016 | B2 * | 4/2014 | Chipman | G06F 16/44 707/737 |

(Continued)

FOREIGN PATENT DOCUMENTS

| CN | 107292813 | 10/2017 |
|---|---|---|
| WO | WO-2016040376 | 3/2016 |

OTHER PUBLICATIONS

Karras, Tero, et al. "Progressive growing of gans for improved quality, stability, and variation." arXiv preprint arXiv:1710.10196 (2017).

(Continued)

*Primary Examiner* — Angela A Armstrong
(74) *Attorney, Agent, or Firm* — Perry + Currier Inc.

(57) ABSTRACT

A system for generating an audio-visual representation of an individual is provided. The system includes an audio-visual representation generator to obtain audio-visual data of an individual communicating responses to prompts. The generator includes a recording analyzer and recording processor to segment the audio-visual data into responsive audio-video segments, or includes a machine learning model to generate artificial audio-visual responses, which simulate the individual communicating a response to the input prompt.

12 Claims, 13 Drawing Sheets

(56) References Cited

U.S. PATENT DOCUMENTS

| | | | |
|---|---|---|---|
| 8,731,919 B2* | 5/2014 | George | G10L 15/26 704/235 |
| 9,020,824 B1* | 4/2015 | Govil | G10L 19/04 704/275 |
| 9,442,933 B2* | 9/2016 | Tzoukermann | G06F 16/48 |
| 2002/0116197 A1* | 8/2002 | Erten | G06K 9/6292 704/273 |
| 2003/0028378 A1 | 2/2003 | August et al. | |
| 2006/0204060 A1* | 9/2006 | Huang | G06K 9/00335 382/118 |
| 2007/0106685 A1* | 5/2007 | Houh | G06F 16/43 |
| 2009/0076795 A1 | 3/2009 | Bangalore et al. | |
| 2012/0116761 A1* | 5/2012 | Wang | G10L 21/06 704/235 |
| 2013/0257877 A1 | 10/2013 | Davis | |
| 2014/0036022 A1 | 2/2014 | Croen et al. | |
| 2014/0161416 A1* | 6/2014 | Chou | H04N 5/91 386/241 |
| 2014/0279050 A1 | 9/2014 | Makar et al. | |
| 2015/0163563 A1 | 6/2015 | An et al. | |
| 2016/0004911 A1* | 1/2016 | Cheng | G11B 27/10 382/159 |
| 2017/0084295 A1* | 3/2017 | Tsiartas | G10L 25/63 |
| 2018/0261203 A1 | 9/2018 | Zoller et al. | |

OTHER PUBLICATIONS

Vondrick, Carl, Hamed Pirsiavash, and Antonio Torralba. "Generating videos with scene dynamics." Advances in neural information processing systems, 2016.

Thies, Justus, et al. "Face2face: Real-time face capture and reenactment of rgb videos." Proceedings of the IEEE conference on computer vision and pattern recognition. 2016.

ISA/CA, International Search Report and Written Opinion, Dec. 11, 2019 re PCT International Patent Application No. PCTIB2019056287.

Rosenfeld, Ronald, Stanley F. Chen, and Xiaojin Zhu. "Whole-sentence exponential language models: a vehicle for linguistic-statistical integration." Computer Speech & Language 15.1 (2001): 55-73.

Nobesawa, Shiho, et al. "Segmenting Sentences into Linky Strings using D-bigram statistics." Proceedings of the 16th conference on Computational linguistics-Volume 2. Association for Computational Linguistics, 1996.

Hearst, Marti a. "TextTiling: Segmenting text into multi-paragraph subtopic passages." Computational linguistics 23.1 (1997): 33-64.

Collobert, Ronan, and Jason Weston. "A unified architecture for natural language processing: Deep neural networks with multitask learning." Proceedings of the 25th international conference on Machine learning. 2008.

Dejong, Gerald. "Prediction and substantiation: a new approach to natural language processing." Cognitive Science 3.3 (1979): 251-273.

Brown, Peter F., et al. "Class-based n-gram models of natural language." Computational linguistics 18.4 (1992): 467-479.

Schank, Roger C. "Conceptual dependency: a theory of natural language understanding." Cognitive psychology 3.4 (1972): 552-631.

Resnik, Philip. "Semantic similarity in a taxonomy: an information-based measure and its application to problems of ambiguity in natural language." Journal of artificial intelligence research 11 (1999): 95-130.

PCT/IB2019/056287, Generating Inveractive Audio-Visual Representations of Individuals, filed Jul. 23, 2019.

* cited by examiner

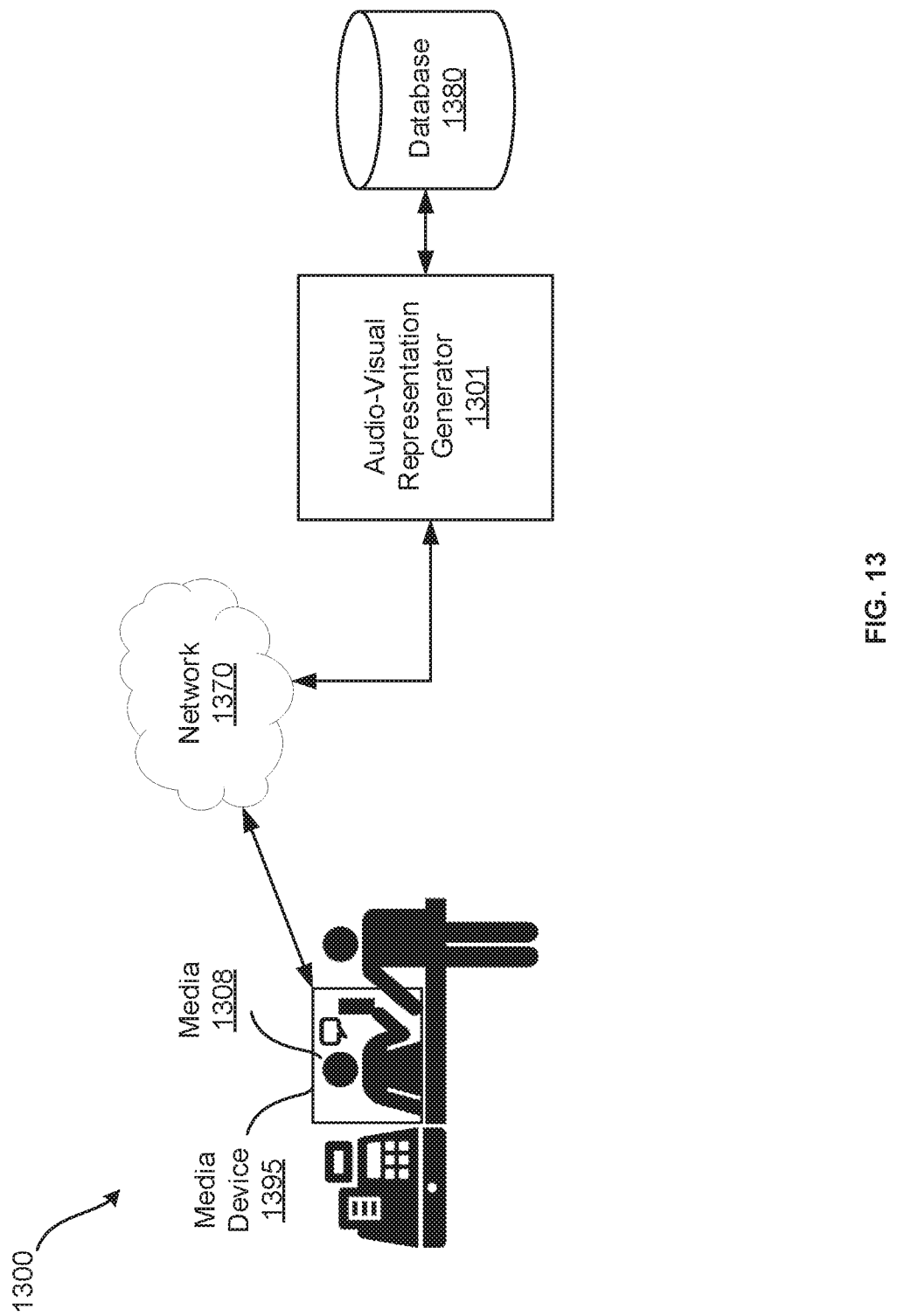

GENERATING INTERACTIVE AUDIO-VISUAL REPRESENTATIONS OF INDIVIDUALS

CROSS-REFERENCE TO RELATED APPLICATIONS

This application claims priority to U.S. Provisional Patent Application No. 62/702,538, filed Jul. 24, 2018, the entirety of which is incorporated herein by reference.

BACKGROUND

Efforts have been made to develop automated interactive systems which simulate interactions with human beings. Such systems have conventionally been implemented in fields in which there has been a drive to replace human labour with automation, such as in the customer service industry with automated checkout kiosks and with automated customer support services, where only limited human engagement is necessary to complete an interaction. In online environments, the development of chat bots has led to software programs capable of carrying on a limited text-to-text conversation with a human. However, despite advancements in speech-to-text transcription, natural language processing and generation, and various video editing, animation, and modelling techniques, such systems have failed to produce interactive audio-visual representations of individuals which respond and appear genuine.

SUMMARY

According to an aspect of the specification, a system for generating an interactive audio-visual representation of an individual is provided. The system includes a memory storage unit to store a plurality of audio-video recordings of an individual communicating responses to prompts, and a recording analyzer to segment the plurality of audio-video recordings into a plurality of audio-video segments according to topics referenced in the responses or the prompts. The system further includes a communication interface to receive a linguistic input, and a recording processor to analyze the linguistic input and generate one or more responsive audio-video segments from the plurality of audio-video segments to be provided in response to the linguistic input. The system further includes an audio-visual media generator to generate a playback of the one or more responsive audio-video segments as an audio-visual representation of the individual responding to the linguistic input.

The one or more responsive audio-video segments may include a plurality of responsive audio-video segments, and the recording processor may include a video segment resequencer, where the recording processor generates the plurality of responsive audio-video segments at least in part by the video segment resequencer selecting and resequencing a plurality of selected responsive audio-video segments from the plurality of audio-video segments.

The recording analyzer may include a video segment labeler to generate keyword labels for the audio-video segments indicating topics covered in the audio-video segments. The communication interface may include an input labeler to generate keyword labels for the linguistic input. Further, the recording processor may generate the one or more responsive audio-video segments by matching keyword labels of the audio-video segments with keyword labels of the linguistic input.

The linguistic input may include an auditory input, and the communication interface may include a text transcriber to transcribe the auditory input into a text input, and the input labeler may generate keyword labels for the linguistic input by generating keyword labels for the input text.

The recording processor may include a natural language processor to determine a meaning of the linguistic input. A prompt may include a question to elucidate an aspect of personality of the individual.

The playback may include an audio-video compilation of the one or more responsive audio-video segments.

The plurality of audio-video recordings may include a plurality of video recording threads, each respective video recording thread captured by a different respective video recording device. The playback may include an augmented reality representation or a virtual reality representation generated with the one or more responsive audio-video segments.

The recording processor may include a machine learning model to select one or more responsive audio-video segments from the plurality of audio-video segments to simulate how the individual may respond to the linguistic input. The machine learning model may include a generative adversarial network adversarially trained to select one or more responsive audio-video segments from the plurality of audio-video segments to simulate how the individual may respond to linguistic inputs.

According to another aspect of the specification, another system for generating an interactive audio-visual representation of an individual is provided. The system includes a memory storage unit to store genuine audio-visual responses to prompts, each genuine audio-visual response including a segment of an audio-video recording of the individual communicating a response to a prompt. The system further includes a communication interface to receive a linguistic input, and a machine learning model to generate an artificial audio-visual response to the linguistic input to simulate how the individual may respond to the linguistic input. The machine learning model is trained with the genuine audio-visual responses to generate artificial audio-visual responses to simulate how the individual may respond to linguistic inputs. The system further includes an audio-visual media generator to generate media as an audio-visual representation of the individual based on the artificial audio-visual response.

The machine learning model may include a generative adversarial network. The generative adversarial network adversarially may be trained with the genuine audio-visual responses to generate artificial audio-visual responses to simulate how the individual may respond to linguistic inputs. The generative adversarial network may include a generator to generate artificial audio-visual responses to simulate how the individual may respond to linguistic inputs, a discriminator to discriminate between artificial audio-visual responses from the generator and genuine audio-visual responses, a data selector to provide test responses to the discriminator, a test response comprising one of an artificial audio-visual response from the generator and a genuine audio-visual response, and an adversarial training module to adversarially train the generative adversarial network. The generative adversarial network may be trained by by positively reinforcing the discriminator or negatively reinforce the generator for the discriminator correctly discriminating between an artificial audio-visual response and a genuine audio-visual response, or by positively reinforcing the generator or negatively reinforce the discriminator for the discriminator failing to correctly discriminate between an artificial audio-visual response and a genuine audio-visual response.

The genuine audio-visual responses to prompts may include a plurality of visual response threads, each respective visual response thread captured by a different respective recording device. Further, the generative adversarial network may include a plurality of generative adversarial units, each generative adversarial unit linked to a different respective visual response thread. Further, each respective generative adversarial unit may include a generator to generate artificial audio-visual responses to simulate how the individual may respond to linguistic inputs based on the genuine audio-visual responses from the respective visual response thread, a discriminator to discriminate between artificial audio-visual responses from the generator and genuine audio-visual responses from the respective visual response thread, and a data selector to provide test responses to the discriminator, a test response comprising one of an artificial audio-visual response from the generator and a genuine audio-visual response from the respective visual response thread. The generative adversarial network may include a multi-thread adversarial training module to adversarially train each generative adversarial unit by positively reinforcing the discriminator or negatively reinforce the generator of a respective generative adversarial unit for the discriminator correctly discriminating between an artificial audio-visual response and a genuine audio-visual response, or by positively reinforcing the generator or negatively reinforce the discriminator of a respective generative adversarial unit for the discriminator failing to discriminate between an artificial audio-visual response and a genuine audio-visual response.

According to yet another aspect of the specification, another system for generating an interactive audio-visual representation of an individual is provided. The system includes one or more recording devices to capture audio-visual data of an individual communicating responses to prompts, an audio-visual representation generator to obtain the audio-visual data, analyze the audio-visual data, receive a input prompt, and generate an audio-visual response to the input prompt based on analysis of the audio-visual data to simulate the individual communicating a response to the input prompt, and a media device to output the audio-visual response.

The audio-visual representation generator may include a recording analyzer to segment the audio-visual data into a plurality of audio-video segments according to topics referenced in the responses or the prompts, and a recording processor to analyze the linguistic input and generate one or more responsive audio-video segments from the plurality of audio-video segments as the audio-visual response.

The audio-visual representation generator may include a machine learning model to generate an artificial audio-visual response to the linguistic input as the audio-visual response. The machine learning model may include a generative adversarial network, the generative adversarial network adversarially trained with the audio-visual data to generate artificial audio-visual responses to simulate how the individual may respond to linguistic inputs.

The audio-visual data may include a plurality of visual recording threads, each respective visual recording thread captured by a different respective recording device, and wherein the media device outputs the audio-visual response in an augmented reality representation.

The audio-visual data may include a plurality of visual recording threads, each respective visual recording thread captured by a different respective recording device, and wherein the media device outputs the audio-visual response in a virtual reality representation.

Other features and advantages are described in greater detail below.

BRIEF DESCRIPTION OF THE DRAWINGS

FIG. 13 is a schematic diagram depicting another example system for generating an interactive audio-visual representation of an individual.

DETAILED DESCRIPTION

A system for generating an audio-visual representation of an individual may be provided which generates an audio-visual representation of an individual which responds and appears genuine based on an analysis of audio-visual data of the individual communicating responses to prompts. The audio-visual data may include audio-video recordings, which may be segmented and resequenced to provide a response which contains content which is genuine to the individual. Responses may also be generated by a machine learning model which has been trained on the audio-visual data to generate artificial responses which simulate how the individual may respond. Thus, an audio-visual representation of an individual may be generated which responds and appears genuine since the raw data used to generate the representation is genuine to the individual.

Figure 1:
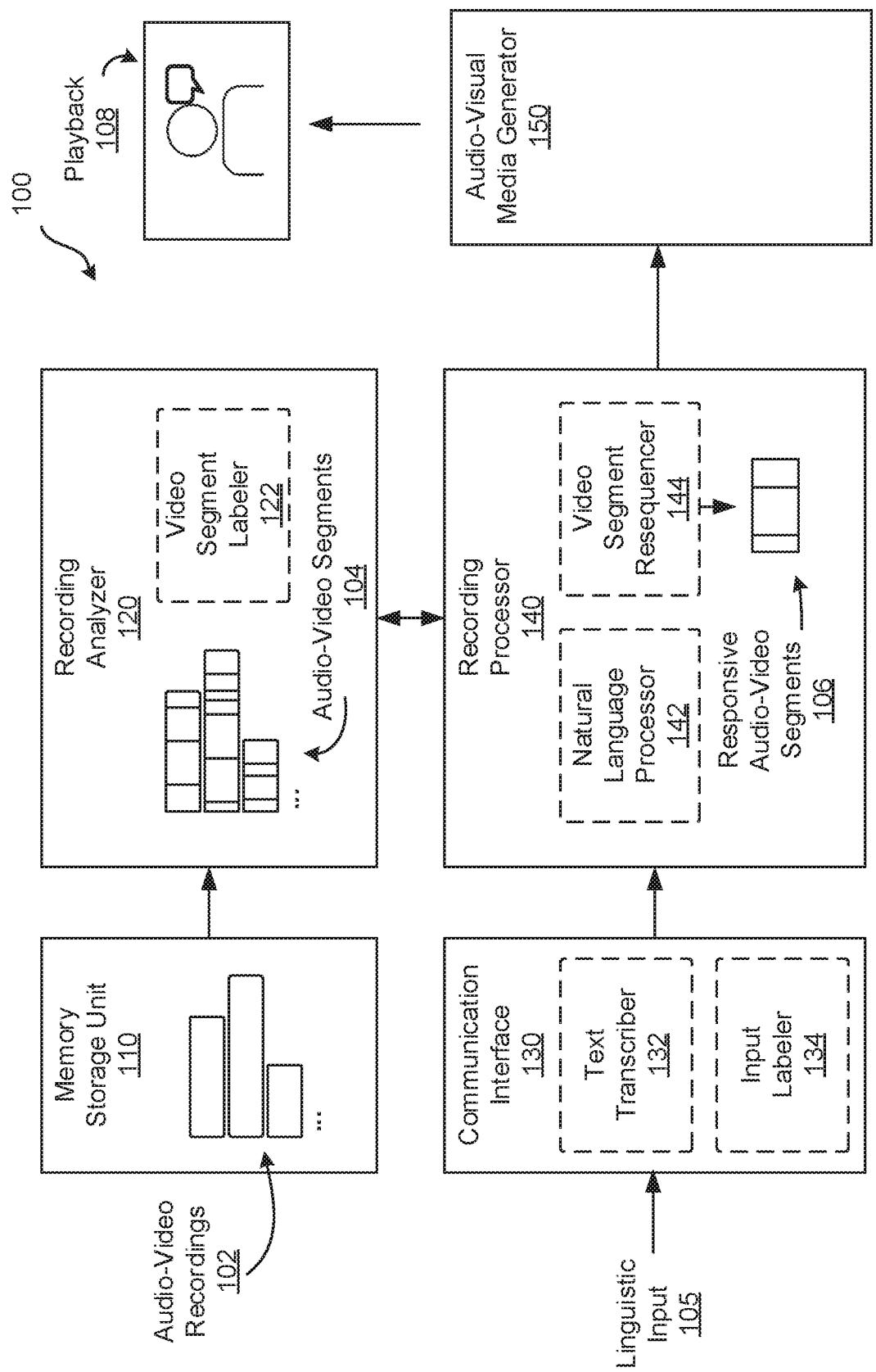
FIG. 1 is a schematic diagram depicting an example interactive audio-visual representation generator.

FIG. 1 depicts an example of such a system. FIG. 1 depicts an example audio-visual representation generator 100. The generator 100 includes a memory storage unit 110 to store a plurality of audio-video recordings 102 of an individual communicating responses to prompts. The memory storage unit 110 may include volatile storage, such as include random-access memory (RAM) or similar, and may include non-volatile storage, such as include a hard drive, flash memory, and similar, to store the audio-video recordings 102. Further, the memory storage unit 110 may host one or more databases for storing audio-video recordings 102 and/or audio-video segments 104. The audio-video recordings 102 are an example of audio-visual data which may be analyzed for the purposes of generating an audio-visual representation of the individual.

A prompt may include any communication, linguistic, gestural, or otherwise, to which the individual has communicated a response. For example, a prompt may include a question which asks the individual to provide an answer. In some examples, a prompt may include a question to elucidate an aspect of personality of the individual. In other examples, a prompt may include a factual question which the individual may answer. In still other examples, a prompt may include any communication from which a reaction from the individual may be captured. For example, the prompt may include a gesture, such as a smile, from which a gesture from the individual may be captured. The audio-video recordings 102 may therefore include sufficient data to capture aspects of the individual's personality, mannerisms, factual history, and/or semantic knowledge. The audio-video recordings 102 may have been captured by any suitable recording device in any suitable way, such as through an interview in which an interviewer asks the individual questions. In other examples, the audio-video recordings 102 may have been collected from sources not generated specifically for the generator 100, such as personal videos, documentaries, films, or other video clips in which the individual is communicating.

The generator 100 further includes a recording analyzer 120 to segment the plurality of audio-video recordings 102 into a plurality of audio-video segments 104 according to the content of the responses or the prompts. For example, the audio-video recordings 102 may be segmented according to the topics covered in a response or prompt, according to a particular word, phrase, idea, or saying in the response, or according to a gesture detected in a response. For example, the response "it is a beautiful day today—I would love to go swimming today" may be segmented into the phrases "it is a beautiful day", "I would love to go swimming today", "I would love to", etc., and the words "beautiful", "day", "swimming", etc.

Figure 2:
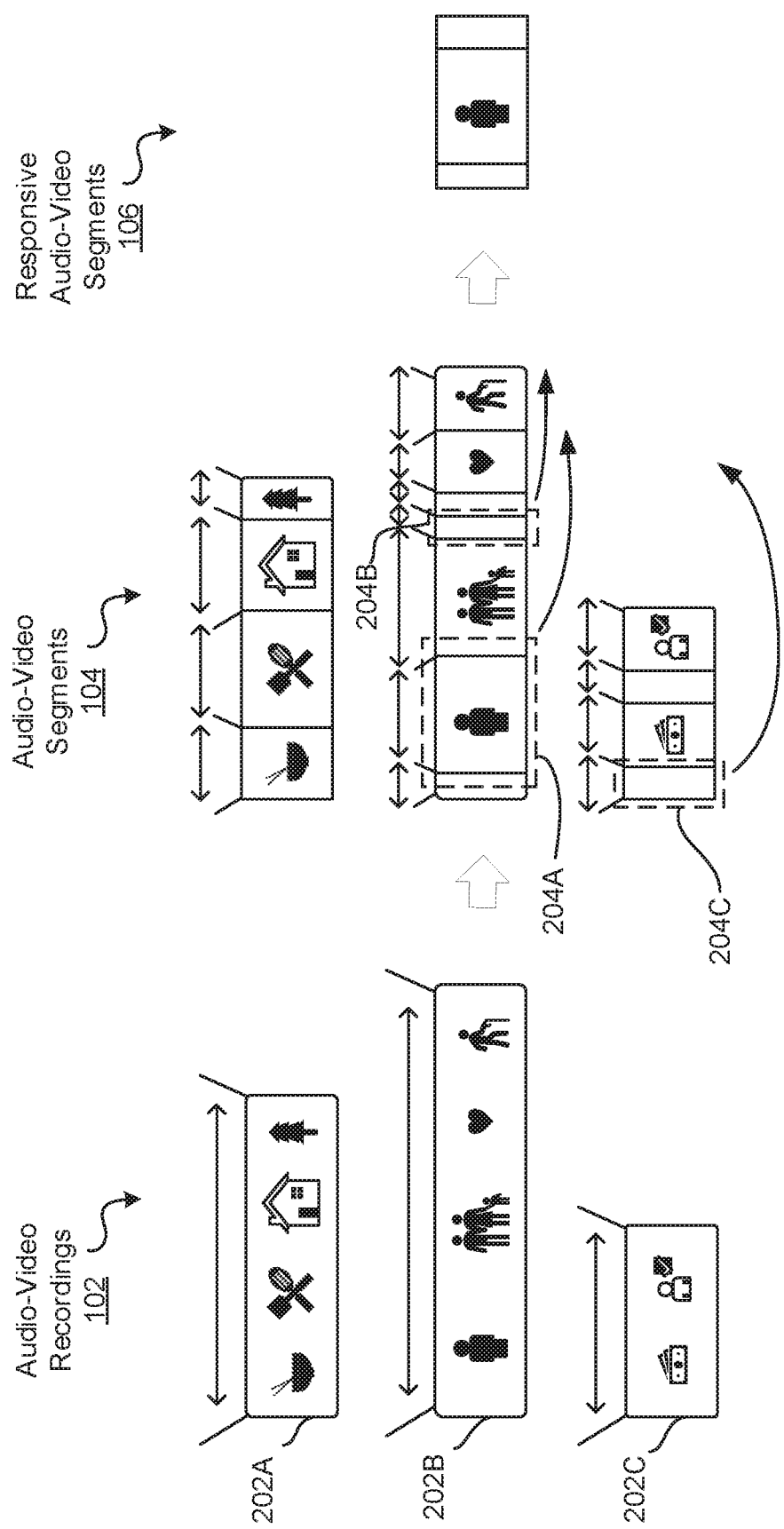
FIG. 2 is a schematic diagram depicting example of how responsive audio-video segments may be selected from audio-video segments, and how audio-video segments may be generated from audio-video recordings.

Further, an audio-video segment 104 may include a segment of any size, such as a short segment depicting a gesture, or a longer segment wherein the individual responds to a question, or a segment containing a portion of a response to a question. Audio-video recordings 102 and audio-video segments 104 may be segmented to an arbitrary degree. In other words, an audio-video segment 104 may be a segment of a larger audio-video segment 104, which may be a segment of a still larger audio-video segment 104, and so on. An example is illustrated in FIG. 2, below.

Thus, a set of audio-video recordings 102 may be segmented into N audio-video segments 104, which may be denoted as V(i), with i ranging from 1 to N.

In some examples, the recording analyzer 120 may include a speech-to-text transcriber and natural language processor to analyze the text to determine the topics of the prompts and/or the responses in the audio-video recordings. Further, the recording analyzer 120 may include an image processor and/or feature recognizer to analyze the audio-video recordings 102 to determine portions of the audio-video recordings 102 including gestures. In some examples, the audio-video recordings 102 may be obtained along with text transcriptions and/or metadata which indicates topics, gestures, and/or other content of the audio-video recordings 102, and the relevant portions of the audio-video recordings 102. In some examples, the audio-video recordings 102 may be obtained along with metadata such as timestamps and labels to indicate where in the audio-video recordings certain content is present. The audio-video recordings 102 may be segmented into audio-video segments 104 according to any of the above exemplary modes of segmentation, or other modes of segmentation.

The generator 100 further includes a communication interface 130 to receive input prompts, such as, in the present example, a linguistic input 105, which may be referred to as a query. The linguistic input 105 may include any linguistic input to which a response from the generator 100 may be generated, such as a question or comment from a person interacting with the generator 100, or simply a set of phrases or words. The linguistic input 105 may include text media, audio media, visual media, or audio-visual media. Where the linguistic input 105 includes text media, the communication interface 130 includes a suitable text media interface to receive the text media. Where the linguistic input 105 includes audio media, the communication interface 130 includes a suitable audio media interface to receive the audio media. Where the linguistic input 105 includes visual media, the communication interface 130 includes a suitable visual media interface to receive the visual media. In other examples, the input prompt may include a gestural or other nonlinguistic prompt to which a response from generator 100 may be generated, such as a smile, a wave, or other gesture as an input prompt.

The generator 100 further includes a recording processor 140 to analyze the linguistic input 105 and generate one or more responsive audio-video segments 106 from the plurality of audio-video segments 104 to be provided in response to the linguistic input 105. The one or more responsive audio-video segments 106 may include a single segment, such as a gesture, or a one-word reply. The one or more responsive audio-video segments 106 may include a plurality of audio-video segments 104, such as a response to a question, a gesture, and a comment about a related topic. Audio-video segments 104 may be combined to an arbitrary degree to formulate a response to the linguistic input 105 which simulates how the individual would respond. In some examples, the response may be topically relevant to the linguistic input 105. For example, the response may include an answer to a question posed in the linguistic input 105. In other examples where the recording processor 140 is unable to generate a topically relevant response to the linguistic input 105, the recording processor 140 may generate a socially appropriate response to the linguistic input 105 which is topically agnostic. For example, where the linguistic input 105 poses a question to which the recording processor 140 is unable to generate an answer based on the audio-video segments 104, the recording processor 140 may generate a response which addresses the linguistic input 105 without providing a topically relevant response, such as, for example, a video segment of the individual saying "I don't know" or "Sorry, I do not have an answer for that question", or an appropriate gesture. Thus, the recording processor 140 may be capable of providing appropriate responses to linguistic inputs 105 regardless of the topical coverage of the audio-video segments 104.

In some examples, the recording processor 140 may include a natural language processor 142 to determine a meaning of the linguistic input 105, to which a suitable response may be generated.

Figure 3:
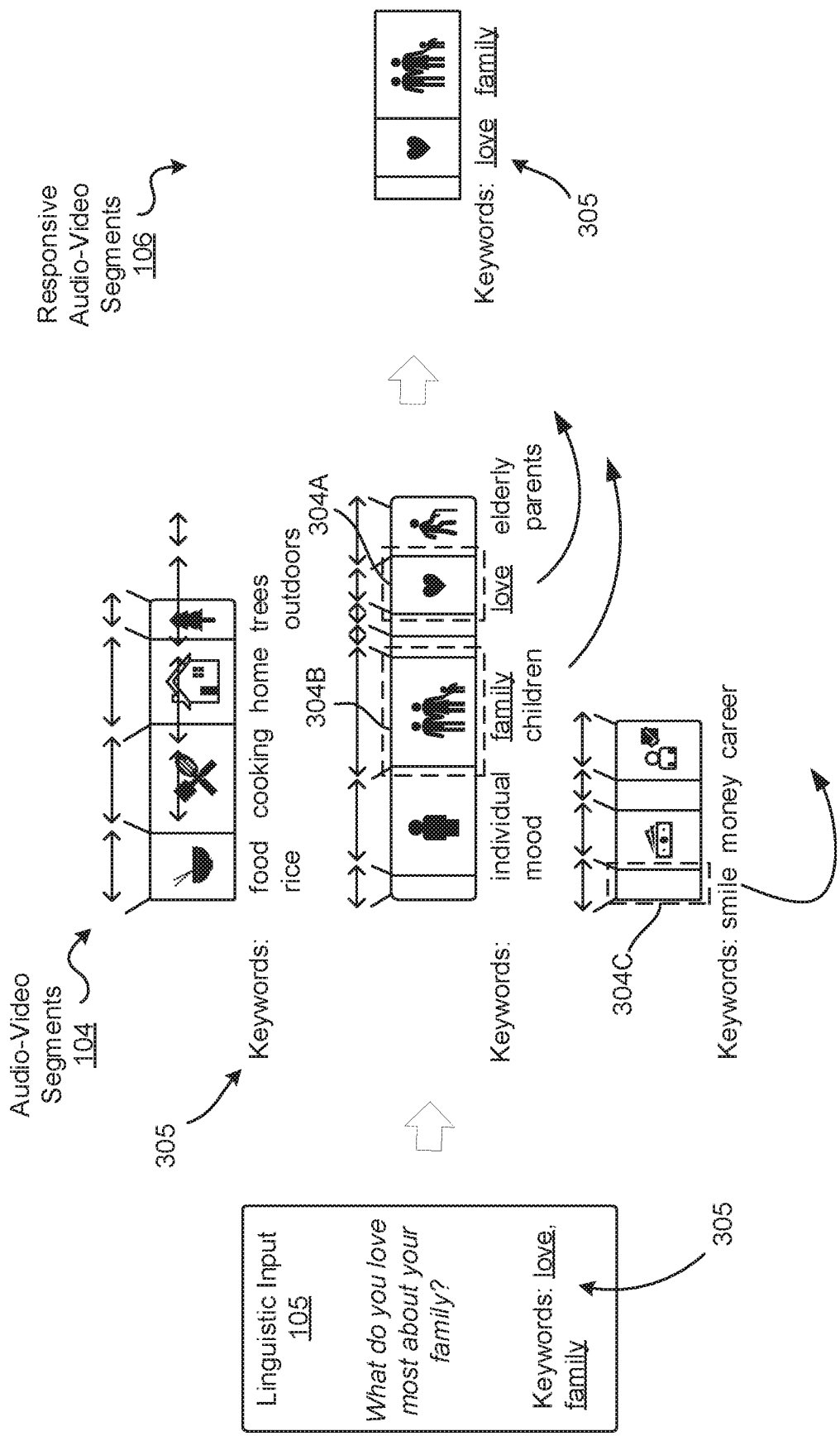
FIG. 3 is a schematic diagram depicting an example of how a linguistic input and audio-video segments may be labelled with keyword labels.

In some examples, responsive audio-video segments 106 may be generated by matching the determined meaning of the linguistic input 105 to audio-video segments 104 which may be combined to be responsive to such meaning. In some of such examples, the matching may be made according to keywords labels assigned to the linguistic input 105 and the audio-video segments 104 in a computer-readable format. In such examples, the communication interface 130 may include an input labeler 134 to generate keyword labels for the linguistic input 105 in a computer-readable format. Further, the recording analyzer 120 may include a video segment labeler 122 to generate keyword labels for the audio-video segments 104. Thus, in such examples, the recording processor 140 may generate the one or more responsive audio-video segments 106 by matching keyword labels of the audio-video segments 104 with keyword labels of the linguistic input 105. An example is illustrated in FIG. 3, below. In examples wherein the one or more responsive audio-video segments 106 comprises a plurality of responsive audio-video segments 106, the recording processor 140 may include a video segment resequencer 144. The video segment resequencer 144 may search an index of audio-video segments 104 for appropriate audio-video segments 104 to respond to the linguistic input 105, such as, for example, by a keyword matching scheme, as described herein. The recording processor 140 may thereby generate the plurality of responsive audio-video segments 106 at least in part by the video segment resequencer 144 selecting and resequencing a plurality of selected responsive audio-video segments 106 from the plurality of audio-video segments.

Where responsive audio-video segments 106 are selected by keyword label matching, the keyword labels may be matched according to various matching schemes. One example keyword label matching scheme is to match keyword labels according to a match score which represents a degree of similarity between keyword labels of a linguistic input 105 and keyword labels of an audio-video segment 104. In some examples, a match score may be based, at least in part, on a number of keyword labels that appear in common between keyword labels of a linguistic input 105 and keyword labels of an audio-video segment 104.

In other words, a score matching function, S(i), may be defined as $S(i)=M(V(i), Q)$, where Q represents a linguistic input 105, $V(i)$ represents the $i^{th}$ audio-video segment 104, and MO represents the score matching function. In some examples where the score matching function is based on keyword matching, the score matching function may be expressed as S(K0,Ki), where K0 represents an array of keywords of the linguistic input 105, Ki represents an array of keywords in an audio-video segment 104, and S represents the match score given the match of K0 to Ki.

In some examples, a match score may be based, at least in part, on an ordering of keyword labels, an interpreted intent of a keyword label, or techniques for matching keyword similarity. In some examples, a match scoring function may be based on a percentage of keyword labels of the linguistic input 105 that are matched, the total number of keywords in common, or any other algorithm for matching keyword lists. For example, if the text associated to V(0) is "It is a beautiful day" and the text associated to V(1) is "I would love to go swimming today", and if the text associated with Q is "What would you like to do today?", then the number of keywords matched to V(0) is 0 and the number of keywords matched to V(1) would be 2 ("would" and "today").

Keyword label matching may involve the identification of exact keyword matches, partial keyword matches (i.e. matching of root words), matching of synonyms or related words, or other techniques for matching text strings. To apply synonym or related word matching to the above example, and considering that "love" is a synonym for "like", then the number of Q keyword matches for V(0) would be 1 ("Day") and for V(1) would be 3 ("would", "today", and "like").

Keyword label matching may involve the matching of unigrams (e.g. individual keywords), bi-grams (e.g. pairs of keywords), tri-grams, or more complex patterns for keyword matching.

Where several possible audio-video segments 104 may be matched, the most appropriate audio-video segments 104 may be selected by various schemes, such as, for example, selecting the top N segments having the highest match scores, or selecting the top M segments having a match score greater than a predetermined threshold.

In examples wherein the linguistic input 105 includes an auditory input, such as a spoken word, comment, or question, by a person interacting with the generator 100. In such examples, the communication interface 130 may include a text transcriber 132 to transcribe the auditory input into a text input and an input labeler 134 to generate keyword labels for the linguistic input 105 by generating keyword labels for the input text.

The generator 100 further includes an audio-visual media generator 150 to generate a playback 108 of the one or more responsive audio-video segments 106 as an audio-visual representation of the individual responding to the linguistic input 105. The playback 108 may include an audio-video output. Thus, in some examples, the playback 108 may include an audio-video compilation of the one or more responsive audio-video segments 106.

In some examples, the communication interface 130 may include a translating system to translate linguistic inputs 105 into the language used by the individual in the audio-video recordings 102. Thus, the communication interface 130 may enable translation of linguistic inputs 105 such that the recording processor 140 may interpret the meaning of a linguistic input 105 in any language and generate an appropriate responsive audio-video segment 106.

Thus, the generator 100 obtains audio-visual data of an individual communicating responses to prompts, analyzes the audio-visual data, receives an input prompt, and generates an audio-visual response to the input prompt based on analysis of the audio-visual data to simulate the individual communicating a response to the input prompt. The generator 100 may thereby generate an interactive audio-visual representation of an individual. In some applications the generator 100 may be used to provide an interactive conversation experience with a representation of a deceased family member, celebrity, historical figure, or other personality for which provision of a genuine representation of the individual is important. In other applications, the generator 100 may be used to provide an interactive conversation experience with a representation of a customer service representative, a skilled professional such as a doctor, or a psychologist, or other profession in which, similarly a genuine representation of the individual may be beneficial.

Although the audio-visual data is described herein as comprising audio-video recordings 102, in other examples, the audio-visual data may include audio recordings paired with associated video recordings as separate media, which may be combinable as audio-visual data. In still other examples, the audio-visual data may include a mixture of audio recordings, video recordings, and audio-video recordings.

FIG. 2 is a schematic diagram depicting an example of how responsive audio-video segments 106 may be selected from audio-video segments 104, and how audio-video segments 104 may be selected from audio-video recordings 102.

The audio-video recordings 102 may include a recording of an individual discussing a variety of topics. The audio-video recordings 102 may include orally communicated responses, nonverbally communicated responses (e.g. gestures), and other auditory or visual information, such as recordings of the individual's facial expression. For example, audio-video recording 202A may relate to cooking and household affairs. Audio-video recording 202B may relate to individuality, family, love, and aging. Audio-video recording 202C may relate to money and personal achievement.

The audio-video segments 104 may include segmented portions of the audio-video recordings 102. The portions may be segmented according to the topic covered in each portion. For example, the audio-video recording 202A may be segmented into different audio-video segments 104 relating to food, meal preparation, household affairs, the outdoors, etc. Other audio-video segments 104 may be segmented according to gestures or facial expressions made by the individual. Other audio-video segments 104 may be segmented according to individual words, phrases, clauses, sounds, or other actions made by the individual.

The responsive audio-video segments 106 may be selected from the audio-video segments 104 to be provided in response to a linguistic input 105. In the example shown, audio-video segments 204A, 204B, and 204C, are selected to responsive audio-video segments 106.

FIG. 3 is a schematic diagram depicting an example of how responsive audio-video segments 106 may be selected from audio-video segments 104 to be responsive to a linguistic input 105.

In the present example, the linguistic input 105 includes the question "What do you love most about your family?", and the input labeler 134 (FIG. 1) generates the keyword labels 305 "love" and "family" to be associated with the linguistic input 105. The video segment labeler 122 (FIG. 1) labels the audio-video segments 104 with keyword labels 305 such as "food", "rice", "cooking", "home", among others. Audio-video segments 304A and 304B are labeled with the keyword labels 305 "love" and "family" respectively. The audio-video segment 304C is labeled with the keyword label 305 "smile", which indicates that the audio-video segment 304C includes a recording of the individual smiling. The audio-video segments 304A, 304B, are labeled with keywords labels 305 which match the keyword labels 305 associated with the linguistic input 105. Thus, the recording processor 140 (FIG. 1) selects the audio-video segments 304A, 304B, in addition to the audio-video segment 304C including the smile gesture, to form the responsive audio-video segments 106.

Resequencing of the responsive audio-video segments 106 may be determined in various ways. The resequencing may be random. The resequencing may be based on contents of the audio-video segments 104, and may be based on the match scores of the audio-video segments 104, or any other algorithm for sequencing video segments.

An example resequencing scheme may involve considering the relationship between segments in the resequencing process. As an example method, a random segment among the segments with the highest match score S(i) (e.g. among the top 20 subsegments) may be initially selected. This selected segment may be deemed the starting segment, denoted as X(0). Next, a next segment may be selected based on its match score S(i), as well as its degree of relevance to the starting segment X(0), which may be denoted as R(i,0). The degree of match may be a degree of relevance as determined by a natural language processing technique. A resequencing score, Z(i), for choosing a second segment to follow the starting segment X(0), may depend on a combination of match score S(i) and relevance score R(i,0). This process may continue until a threshold number of segments is chosen to be added to the response, or where adding an additional segment would involve adding a segment having resequencing score Z(i) below a threshold.

In other examples, a resequencing scheme may involve considering a degree of continuity between adjacent segments in a response. A degree of continuity between adjacent segments may be based on the degree of visual continuity between adjacent segments, a degree of auditory continuity between adjacent segments, or a combination thereof. The degree of visual continuity between adjacent segments may be based on the visual similarity between the last frame (or frames) of a segment and the first frame (or frames) of the following segment. Thus, segments which visually skip or jerk have a low degree of visual continuity, and segments which smoothly transition visually from one segment to the next have a high degree of visual continuity. The degree of auditory continuity between adjacent segments may be based on the auditory similarity between the last portion (or portions) of a segment and the first portion (or portions) of the following segment. Thus, segments which auditorily skip or jerk have a low degree of auditory continuity, and segments which smoothly transition auditorily from one segment to the next have a high degree of auditory continuity. Thus, sequences of segments which include smoother visual and/or auditory transitions may be afforded a high continuity score C(i, j), where i and j are adjacent segments in a sequence. Consideration of a continuity score may inhibit a sequence of segments from being selected as a response where the sequence of segments is too discontinuous. For example, sequences of segments which include too many discontinuous segments may be less likely to be provided as responsive audio-video segments 106.

In some examples, the recording processor 140 may include a visual smoother to improve the visual continuity between adjacent segments, thus improving the continuity score of a sequence of segments. The visual smoother may blend, transition, or otherwise adjust the visual data (e.g. pixels) of the beginning and/or ending frames of audio-video segments 104 to more closely match the visual data of adjacent segments. In some examples, the recording processor 140 may include an audio smoother to improve the auditory continuation between adjacent segments, thus improving the continuity score of a sequence of segments. The audio smoother may blend, transition, or otherwise adjust the auditory data of the beginning and/or ending frames of audio-video segments 104 to more closely match the auditory data of adjacent segments.

An example resequencing scheme may select a sequence of responsive audio-video segments 106 based on any one or combination of a match score, relevance score, and continuity score.

As mentioned, a prompt, or query, from which audio-video recordings 102 are derived, may include any communication to which the individual has communicated a response, such as a question or comment. In some examples, a query may include a question to elucidate an aspect of personality of the individual. In other examples, a linguistic input 105 may include a factual question.

A query may include a general introduction, a question about the individual's life experiences, such as "what is an example of a difficult life experience or failure that has helped you build your strength?". A query may include a question asking for advice, such as "how were you able to get through difficult times in your life?". Other queries may relate to the individual's family and personal life, including hopes and feelings about family members. Such questions may elucidate answers from the individual which illuminate aspects of the individual's personality, and which contribute to a rich repository of statements, responses, reactions, gestures, and more, as communicated through the individual themselves. Thus, by recording responses to such queries, the generator 100 may obtain sufficient data to capture aspects of the individual's personality, mannerisms, factual history, and/or semantic knowledge, which may enable the generator 100 to produce a genuine representation of the individual.

Figure 4:
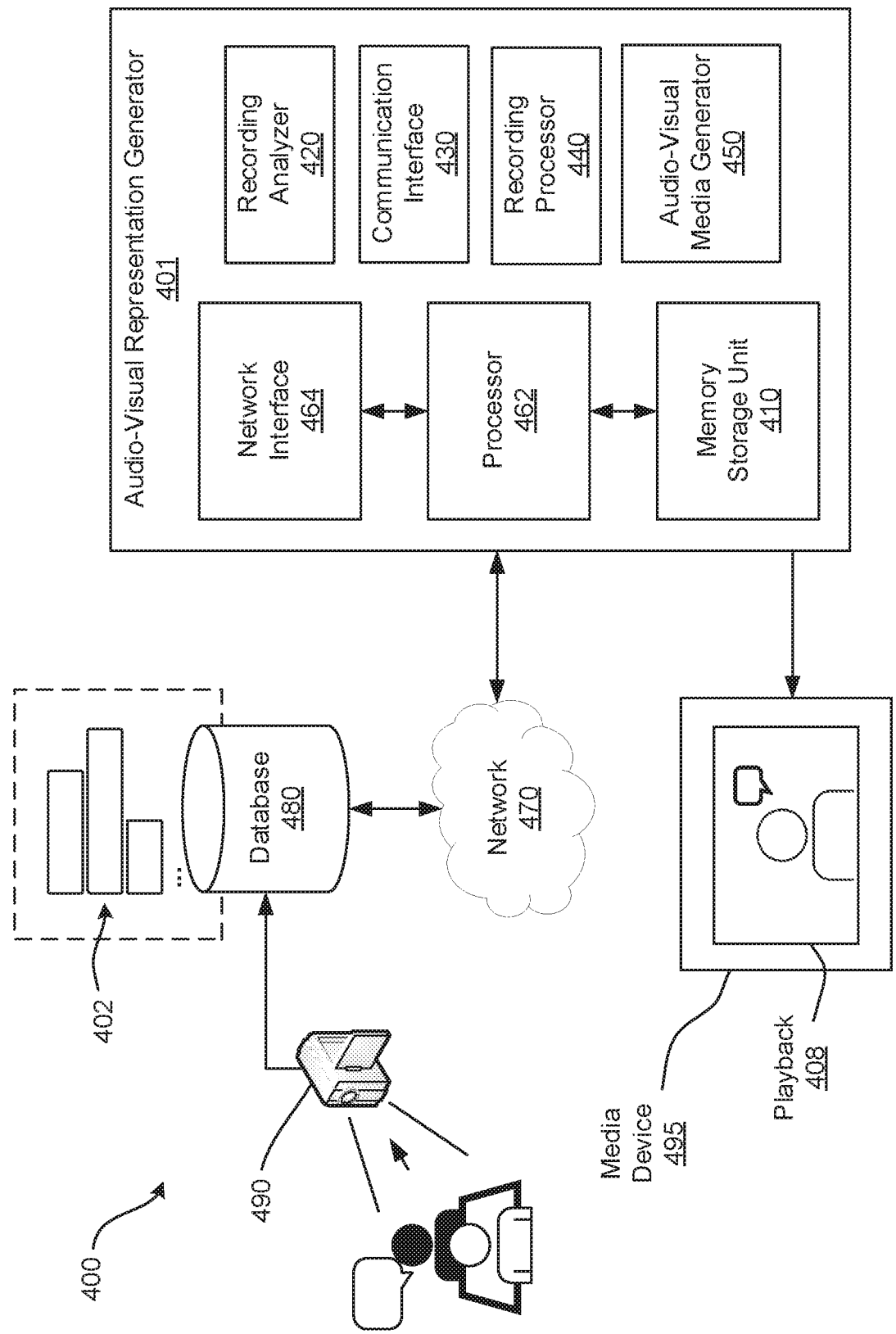
FIG. 4 is a schematic diagram depicting an example system for generating an interactive audio-visual representation of an individual, the system including an audio-video recording device.

FIG. 4 is a schematic diagram depicting an example system 400 for generating an audio-visual representation of an individual. The generator 100 includes a audio-visual representation generator 401, which may be similar to the audio-visual representation generator 100. The generator 401 operates to analyze audio-video recordings 402 of an individual communicating responses to prompts, and to generate a playback 408 as an audio-visual representation of an individual based on the audio-video recordings 402. The generator 401 therefore includes a memory storage unit 410, a recording analyzer 420, a communication interface 430, a recording processor 440, and an audio-visual media generator 450. For further description of these elements, description of the generator 100 of FIG. 1 may be referenced.

The generator 401 further includes a processor 462 and network interface 464. Although a single processor 462 is shown, the term "processor" as discussed herein refers to any quantity and combination of a processor, a central processing unit (CPU), a microprocessor, a microcontroller, a field-programmable gate array (FPGA), and similar. The network interface 464 includes programming logic enabling the generator 401 to communicate over network 470, is configured for bidirectional data communications through the network 470, and accordingly can include a network adaptor and driver suitable for the type of network used.

Further, the memory storage unit 410 may store programming instructions for executing any of the operation of the recording analyzer 420, communication interface 430, recording processor 440, audio-visual media generator 450, or the audio-visual representation generator 401 generally. Further, it is to be understood that the recording analyzer 420, communication interface 430, recording processor 440, audio-visual media generator 450, or the audio-visual representation generator 401 generally may be implemented as separate processor-executable programs, within the same processor-executable program, or as combinations of processor-executable programs, and by the same computing device, separate computing devices, or combinations of computing devices.

The generator 401 may communicate over the network 470 to obtain audio-video recordings 402 from a database 480. The database 480 may store audio-video recordings 402 according to an index along with associated prompts which were used to generate the responses in the audio-video recordings 402 in a computer-readable format. Although depicted as a database 480, it is to be understood that the database 480 may be part of a data storage system including one or more computing devices with storage, communication, and processing means.

The audio-video recordings 402 may be captured by one or more recording devices 490. As depicted, the recording device 490 is oriented to capture the responses of an individual being interviewed by a person for the capture of audio-video recordings 402.

The generator 401 and database 480 are in communication over one or more computer networks, indicated as network 470. The network 470 can include the internet, a Wi-Fi network, a local-area network, a wide-area network (WAN), a wireless cellular data network, a virtual private network (VPN), a combination of such, and similar.

The playback 408 may be transmitted to a media device 495 for output. The media device 495 may include an auditory output device such as a speaker and a visual output device such as a display screen, augmented reality device, or virtual reality device. In some examples, the media device 495 may be part of a computing device which further includes the generator 401 such that a person may interact with the generator 401 on a single device.

In other examples, the generator 401 may be remote from the media device 495, such as where the generator 401 is hosted on a remote server, and the media device 495 is local to the person interacting with the generator 401 over the network 470. In such examples, the media device 495 or a related computing device may include suitable text, audio, and/or media interfaces for communicating with the generator 401.

Figure 5:
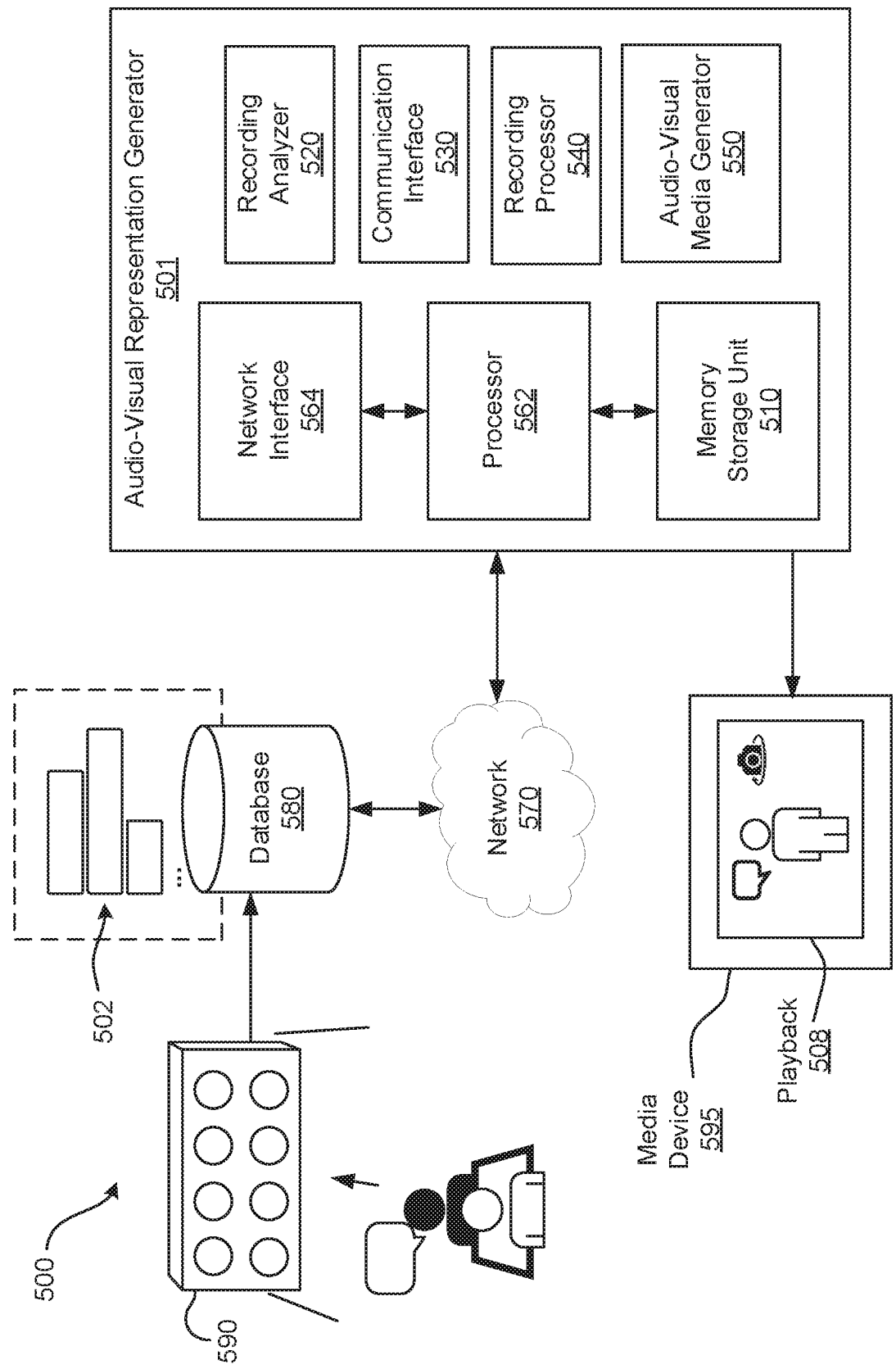
FIG. 5 is a schematic diagram depicting an example system for generating an interactive audio-visual representation of an individual, the system including a plurality of audio-video recording devices.

FIG. 5 is a schematic diagram depicting an example system 500 for generating an audio-visual representation of an individual. The system 500 is similar to the generator 401 with like components having like numbers, however in a "500" series rather than a "400" series. Thus, the system 500 includes an audio-visual representation generator 501, which includes a memory storage unit 510, a recording analyzer 520, a communication interface 530, a recording processor 540, an audio-visual media generator 550, a network interface 564, and a processor 562. The system 500 further includes a database 580, audio-video recordings 502, a network 570, a media device 595, and playback 508. For further description of the above elements, the description of system 400 of FIG. 4 may be referenced.

The system 500 includes a multi-thread recording device 590 to capture the audio-video recordings 502. Further, the audio-video recordings 502 include plurality of video recording threads, where each respective video recording thread captured is captured by a different respective video recording device of the multi-thread recording device 590.

For example, the multi-thread recording device 590 may include a plurality of recording devices, each to capture a different respective thread. In some examples, the multi-thread recording device 590 may include a plurality of cameras, each camera arranged to capture visual data of the individual from a different orientation. In other examples, the multi-thread recording device 590 may include one or more stereoscopic cameras, where each recording device therein corresponds to a different visual thread. In some examples, the multi-thread recording device 590 may include a synchronized camera array. Thus, more detailed visual information describing how the individual responds to prompts may be gathered. Further, a three-dimensional representation of the individual may be captured.

Further, the playback 508 may incorporate a plurality of video recording threads to generate a synthesized representation of the individual. The synthesized representation may include a three-dimensional life-like representation of the individual. For example, the playback 508 may include an augmented reality representation. In other examples, the playback 508 may include a virtual reality representation. In such examples, the three-dimensional representation of the individual may be referred to as an avatar.

Figure 6:
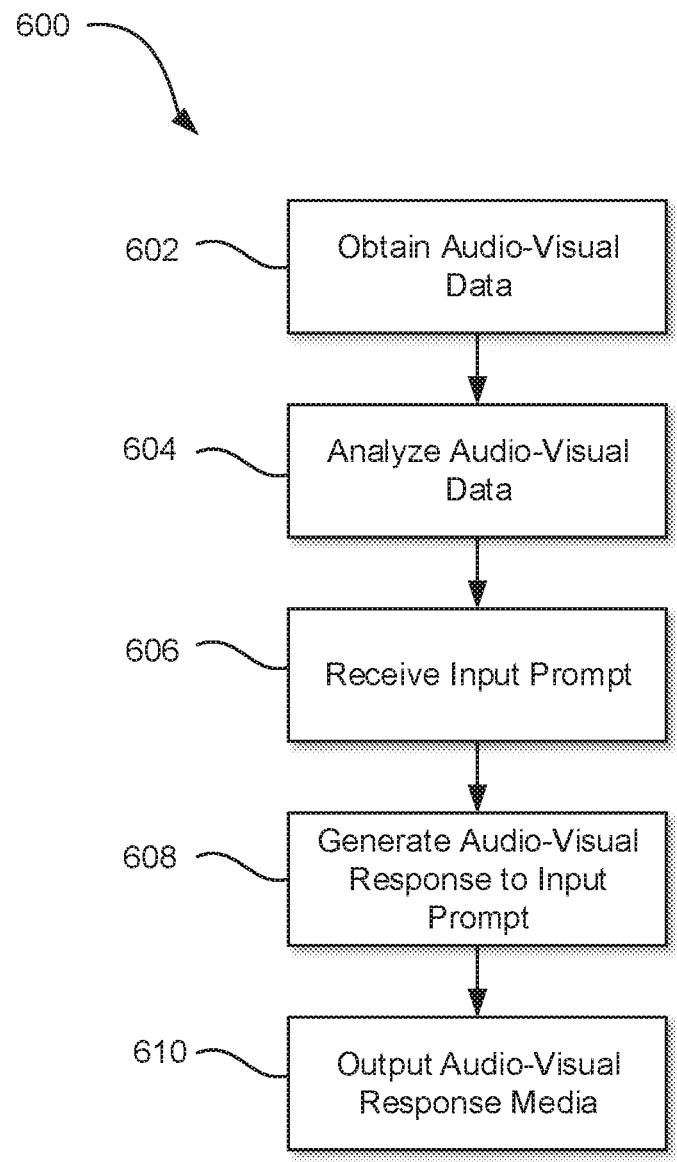
FIG. 6 is a flow chart of an example method for generating an interactive audio-visual representation of an individual.

FIG. 6 is a flowchart depicting an example method 600 for generating an audio-visual representation of an individual. The method 600 is one way in which an audio-visual representation of an individual may be generated. It is to be emphasized, however, that the blocks of method 600 need not be performed in the exact sequence as shown. Further, the method 600 may be performed by a system described above, such as generator 100. For clarity, the method 600 has been described with reference to the generator 100 and the systems 400 and 500, but this is not limiting, and the method 600 may be performed by other systems and/or devices.

At block 602, the generator 100 obtains audio-visual data of an individual communicating responses to prompts, as described herein. For example, the generator 100 may obtain audio-visual data as audio-video recordings 102 from a memory storage unit 110.

At block 604, the generator 100 analyzes the audio-visual data, as described herein. For example, the recording analyzer 120 segments the audio-video recordings 102 into audio-video segments 104, and the video segment labeler 122 labels the audio-video segments 104 with keyword labels.

At block 606, the generator 100 receives an input prompt, as described herein. For example, the generator 100 receives a linguistic input 105 via communication interface 130 wherein a person asks a question of the generator 100. A text transcriber 132 may further transcribe the linguistic input 105 into text, and an input labeler 134 may label the linguistic input 105 with keyword labels.

At block 608, the generator 100 generates an audio-visual response to the input prompt based on analysis of the audio-visual data to simulate the individual communicating a response to the input prompt, as described herein. For example, the recording processor 140 may determine a meaning of the linguistic input 105 and match the determined meaning with appropriate audio-video segments 104 to produce a response to the linguistic input 105. For example, a natural language processor 142 may determine a meaning of a transcribed input text, and a video segment resequencer 144 may resequence a plurality of audio-video segments 104 to provide an audio-visual response which simulates how the individual may respond to the linguistic input 105.

At block 610, the audio-visual response is outputted as media, as described herein. For example, the media device 495 of the system 400 outputs the playback 408. The playback 408 may include a video compilation of video segments or may incorporate a plurality of video recording threads to generate a synthesized representation of the individual, such as a three-dimensional representation of the individual, such as in an augmented reality representation or a virtual reality representation.

Figure 7:
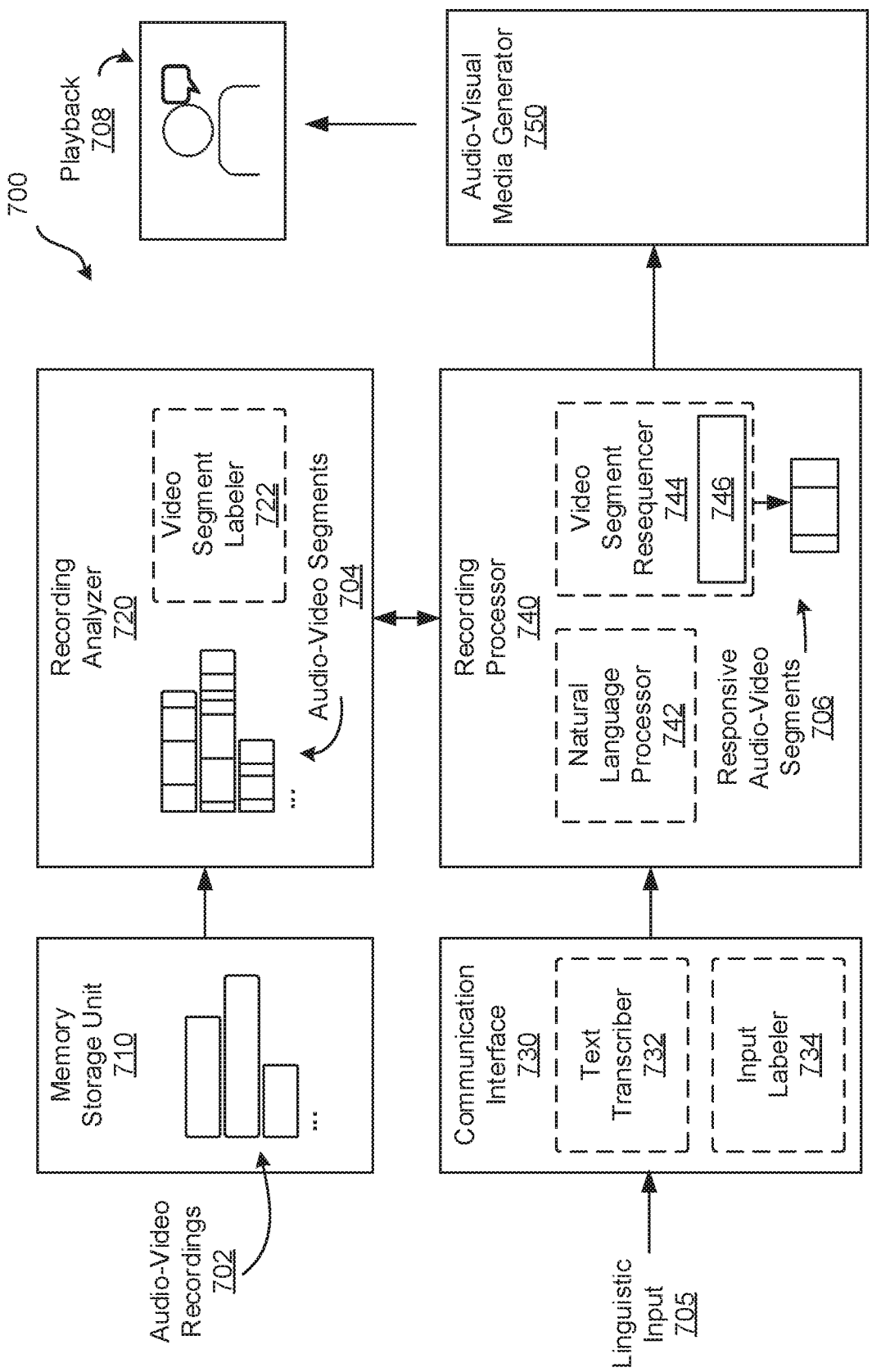
FIG. 7 is a schematic diagram depicting another example system for generating an interactive audio-visual representation of an individual, the system including a video segment resequencer including a machine learning model.

FIG. 7 is a schematic diagram depicting another example audio-visual representation generator 700. The generator 700 is similar to the generator 100 with like components having like numbers, however in a "700" series rather than a "100" series. Thus, the generator 700 includes a memory storage unit 710, a recording analyzer 720, a communication interface 730, a recording processor 740, an audio-visual media generator 750, audio-video recordings 702, audio-video segments 704, linguistic input 705, responsive audio-video segments 706, and playback 708. In some examples, the recording analyzer 720 may include a video segment labeler 722, the communication interface 730 may include a text transcriber 732 and an input labeler 734, and the recording processor 740 may include a natural language processor 742. For further description of the above elements, the description of generator 100 of FIG. 1 may be referenced.

Further, the recording processor 740 includes a video segment resequencer 744, which may be similar to the video segment resequencer 144, but which includes a machine learning model 746 trained to select one or more responsive audio-video segments 706 from the plurality of audio-video segments 704 to simulate how the individual may respond to the linguistic input 705.

The machine learning model 746 may include a generative adversarial network adversarially trained with the plurality of audio-video recordings 702 to select one or more responsive audio-video segments 706 from the plurality of audio-video segments 704 to simulate how the individual may respond to linguistic inputs 705.

Figure 8:
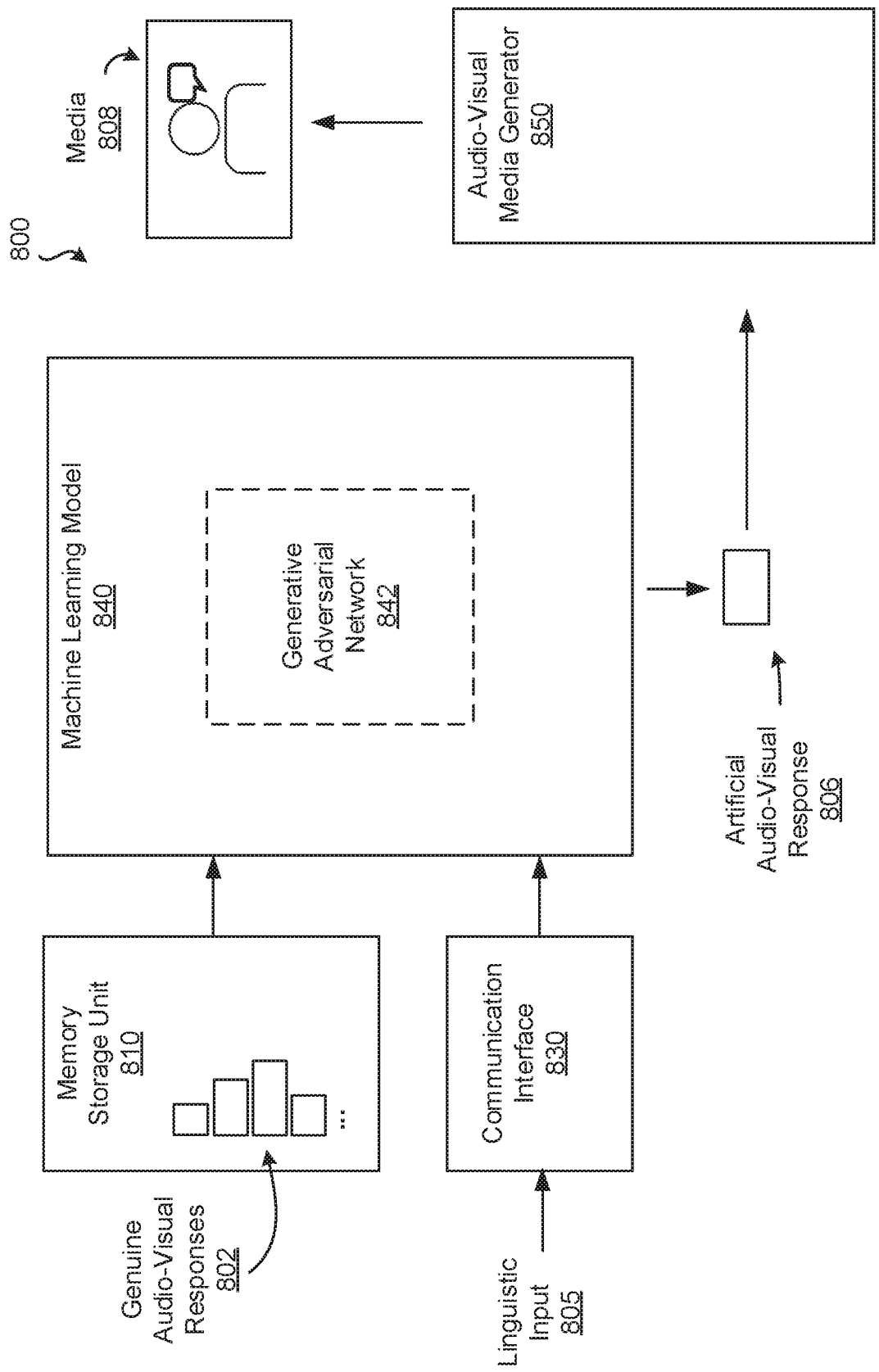
FIG. 8 is a schematic diagram depicting yet another example system for generating an interactive audio-visual representation of an individual, the system including a machine learning model for generating artificial audio-visual responses to linguistic inputs.

FIG. 8 is a schematic diagram of another example audio-visual representation generator 800. The generator 800 includes a memory storage unit 810 to store genuine audio-visual responses 802 to prompts. The generator 800 further includes a communication interface 830 to receive a linguistic input 805. The generator 800 further includes an audio-visual media generator 850 to generate media 808 of an audio-visual representation of the individual based on the artificial audio-visual response 806. The memory storage unit 810, communication interface 830, and audio-visual media generator 850 may be similar to the memory storage unit 110, communication interface 130, and audio-visual media generator 150 of the generator 100, and thus for further description of the above elements, the description of generator 100 of FIG. 1 may be referenced.

Each genuine audio-visual responses 802 may include a segment of an audio-video recording of the individual communicating a response to a prompt, similar to audio-video segments 104. Thus for further description thereof, the description of generator 100 of FIG. 1 may be referenced.

The generator 800 further includes a machine learning model 840 to generate an artificial audio-visual response 806 to the linguistic input 805 to simulate how the individual may respond to the linguistic input 805. The machine learning model 840 is trained with the genuine audio-visual responses 802 to generate artificial audio-visual responses 806 to simulate how the individual may respond to linguistic inputs 805. The artificial audio-visual response 806 is output by the audio-visual media generator 850 as media 808 to simulate how the individual may respond to the linguistic input 805. The media 808 which may include any text, audio, visual, or audio-visual media, including video, augmented reality, or virtual reality media.

In some examples, the machine learning model 840 may include a generative adversarial network 842. The generative adversarial network 842 may be adversarially trained with the genuine audio-visual responses 802 to generate artificial audio-visual responses 806 to simulate how the individual may respond to linguistic inputs 805. The generative adversarial network 842 may be similar to the generative adversarial network 900 (FIG. 9), described below.

Figure 9:
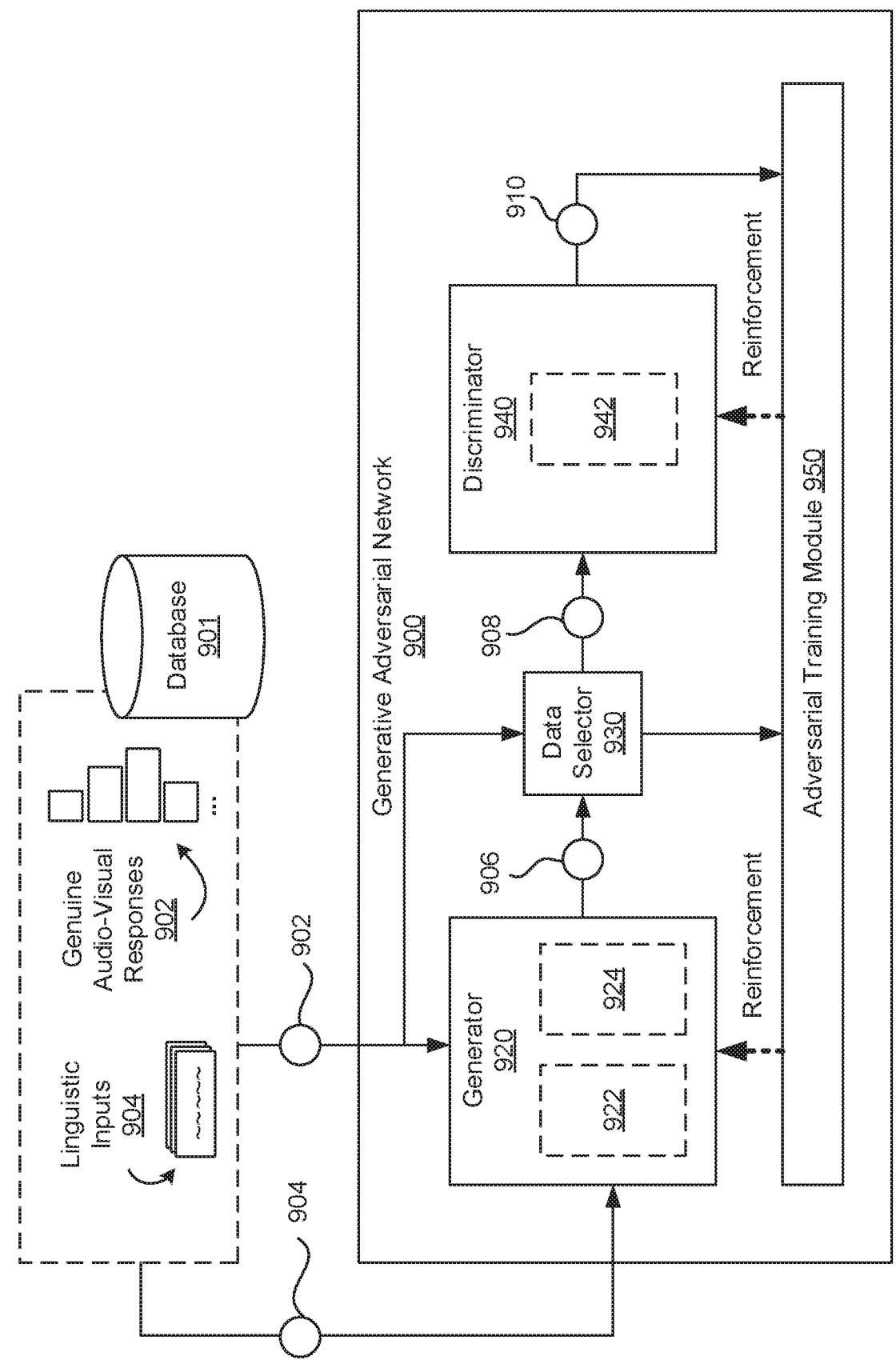
FIG. 9 is a schematic diagram depicting the training of an example generative adversarial network to generate artificial audio-visual responses to linguistic inputs.

FIG. 9 is a schematic diagram depicting an example of the generative adversarial network 900 and the training there of to generate artificial audio-visual responses in response to linguistic inputs. FIG. 9 represents one way in which the generative adversarial network 900 may be designed and trained, but this is not intended to be limiting.

The generative adversarial network 900 communicates with a database 901 to obtain genuine audio-visual responses 902 and linguistic inputs 904. The database 901 stores genuine audio-visual responses 902 in association with associated prompts, i.e., linguistic inputs 904. In other words, each genuine audio-visual response 902 includes a communication provided by the individual in response to a prompt such as a linguistic input 904.

The network 900 includes a generator 920 to generate artificial audio-visual responses 906 to simulate how the individual may respond to linguistic inputs 904. The generator 920 obtains linguistic inputs 904 and genuine audio-visual responses 902, and is trained to generate artificial audio-visual responses 906 therefrom.

The network 900 further includes a discriminator 940 to discriminate between artificial audio-visual responses 906 from the generator 920 and genuine audio-visual responses 902. The discriminator 940 outputs a determination 910 of whether it is analyzing an artificial audio-visual response 906 and a genuine audio-visual response 902.

The network 900 further includes a data selector 930 to provide test responses 908 to the discriminator 940 for analysis. A test response may include an artificial audio-visual response 906 from the generator 920 or a genuine audio-visual response 902. The data selector 930 alternatively provides either an artificial audio-visual response 906 or a genuine audio-visual response 902 to train the discriminator 940 to distinguish between the two kinds of data.

The network 900 further includes an adversarial training module 950 to adversarially train the generative adversarial network 900. The adversarial training module 950 receives an indication from the data selector 930 whether the test response 908 includes an artificial audio-visual response 906 and a genuine audio-visual response 902, and receives the determination 910 made by the discriminator 940. The generative adversarial network 900 may be trained by positively reinforcing the discriminator 940 (or negatively reinforce the generator 920) for the discriminator 940 correctly discriminating between an artificial audio-visual response 906 and a genuine audio-visual response 902. Conversely, the generative adversarial network 900 may be trained by positively reinforcing the generator 920 (or negatively reinforce the discriminator 940) for the discriminator 940 failing to correctly discriminate between an artificial audio-visual response 906 and a genuine audio-visual response 902.

In some examples, the generator 920 may include an encoder 922 to learn rules from the training data of the genuine audio-visual responses 902 and linguistic inputs 904, and a decoder 924 to generate the artificial audio-visual responses 906 based on the learned rules. The discriminator 940 may include a decoder 942 to discriminate between artificial audio-visual responses 906 and genuine audio-visual responses 902.

Figure 10:
FIG. 10 is a schematic diagram depicting the generative adversarial network of FIG. 9 to generate an artificial audio-visual response to a linguistic input.

FIG. 10 is a schematic diagram depicting the generative adversarial network 900 to generating an artificial audio-visual response 906 to a linguistic input 904. Once trained, the generative adversarial network 900 may generate an audio-visual response 906 in response to a linguistic input 904 to simulate how an individual may respond to the linguistic input 904.

Figure 11:
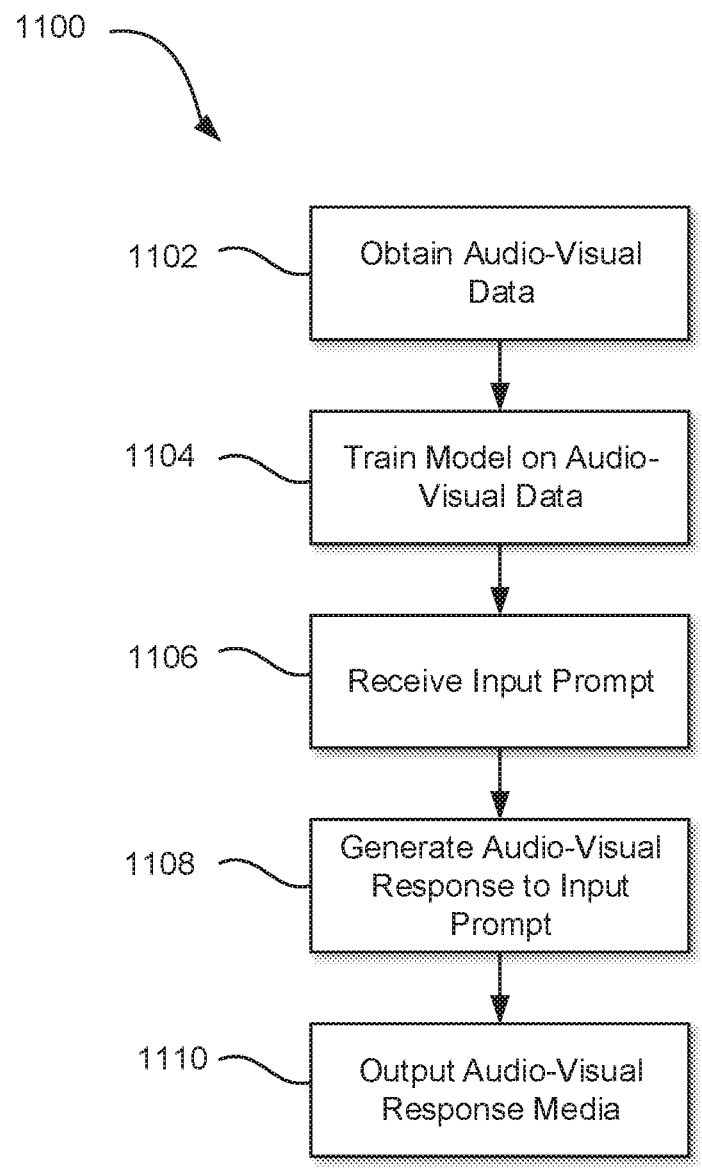
FIG. 11 is a flowchart of an example method for generating an interactive audio-visual representation of an individual using a machine learning model.

FIG. 11 is a flowchart of an example method 1100 for generating an audio-visual representation of an individual using a machine learning model. The method 1100 is one way in which an audio-visual representation of an individual may be generated. It is to be emphasized, however, that the blocks of method 1100 need not be performed in the exact sequence as shown. Further, the method 1100 may be performed by a system described above, such as generator 800. For clarity, the method 1100 has been described with reference to the generator 800 and the system 400, but this is not limiting, and the method 1100 may be performed by other systems and/or devices.

At block 1102, the generator 800 obtains audio-visual data of an individual communicating responses to prompts, as described herein. For example, the generator 800 may obtain audio-visual data as genuine audio-visual responses 802 from a memory storage unit 810.

At block 1104, the generator 800 trains a machine learning model 840, as described herein. For example, a generative adversarial network 842 may be adversarially trained with the genuine audio-visual responses 802 to generate artificial audio-visual responses 806 to simulate how the individual may respond to linguistic inputs 805.

Training the generative adversarial network 842 may involve the generator 920 generating artificial audio-visual responses 906 based on the training data of the genuine audio-visual responses 902 and linguistic inputs 904, the data selector 930 transmitting either genuine audio-visual responses 902 or artificial audio-visual responses 906 as test responses 908 to the discriminator, the discriminator 940 generating a determination 910 of whether the received data is genuine or not, and the adversarial training module 950 positively or negatively reinforcing the generator 920 or discriminator 940 based on whether the determination 910 is accurate. The network 842 may be trained together using methods such as back propagation or other methods for training deep neural networks. Thus, the generator 920 may become trained to produce convincingly genuine artificial audio-visual responses 906, and the discriminator 940 becomes trained to accurately detect artificial audio-visual responses 906 which do not appear genuine.

At block 1106, the generator 800 receives an input prompt, as described herein. For example, the generator 800 receives a linguistic input 805 via communication interface 830 wherein a person asks a question of the generator 800.

At block 1108, the generator 800 generates an artificial audio-visual response 806 to the input prompt via the machine learning model 840, as described herein.

At block 1110, the artificial audio-visual response 806 is outputted as media, as described herein. For example, a media device similar to the media device 495 of the system 400 may output the media 808. The media 808 may include a video compilation of video segments or a media 808 may incorporate a plurality of video recording threads to generate a synthesized representation of the individual, such as a three-dimensional representation of the individual, such as in an augmented reality representation or a virtual reality representation.

Figure 12:
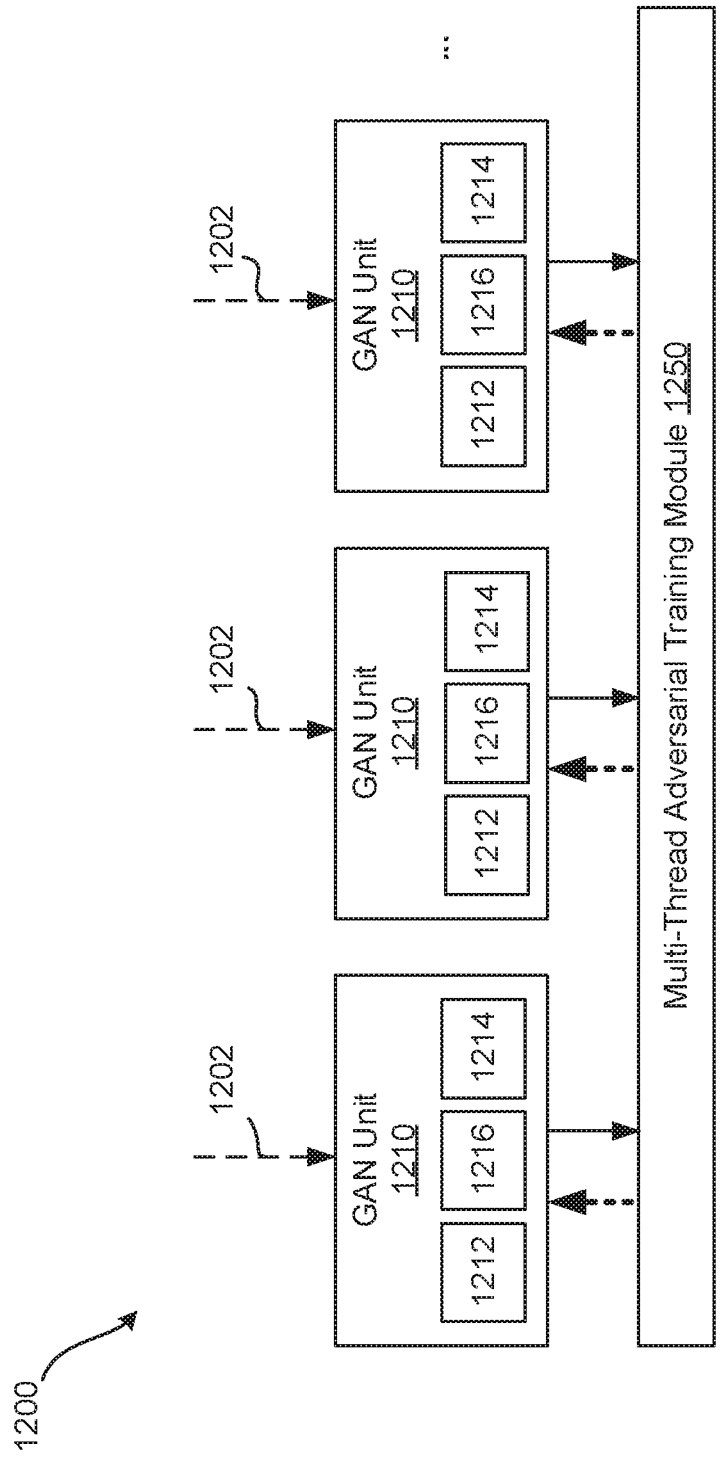
FIG. 12 is a schematic diagram depicting a generative adversarial network to generate artificial audio-visual responses in response to linguistic inputs, the generative adversarial network including a plurality of generative adversarial units linked to different visual threads.

FIG. 12 is a schematic diagram depicting another example generative adversarial network 1200 to generate artificial audio-visual responses in response to linguistic inputs. The network 1200 may be applied to generate a visual representation of an individual from a set of genuine audio-visual responses which comprises a plurality of visual response threads 1202 captured by different recording devices. For example, the recording processor 540 of system 500 may be adapted to incorporate the adversarial network 1200 to cooperate with the multi-thread recording device 590.

The network 1200 includes a plurality of generative adversarial network units (GAN Units) 1210, each GAN Unit 1210 being associated with a different recording device. In other words, the network 1200 includes a plurality of GAN Units 1210, where each GAN Unit 1210 is linked to a different respective visual response thread 1202. Each GAN Unit 1210 may be simultaneously trained to enable the network 1200 to generate artificial audio-visual responses which appear genuine based on respective visual response threads 1202. The artificial audio-visual responses may include a three-dimensional representation of the individual or a higher fidelity two-dimensional representation of the individual.

Each GAN Unit 1210 includes a generator 1212, a discriminator 1214, and a data selector 1216. The generators 1212, discriminators 1214, and data selectors 1216 are each in communication with a multi-thread adversarial training module 1250. The generators 1212, discriminators 1214, and data selectors 1216, may be similar to the generator 920, discriminator 940, and data selector 930 of the generative adversarial network 900 of FIG. 9. The multi-thread adversarial training module 1250 may be similar to the adversarial training module 950 of the network 900 of FIG. 9, but may train each of the GAN Units 1210 simultaneously. Thus, for further description of the above elements, the description of the network 900 of FIG. 9 may be referenced.

A GAN Unit 1210 includes a generator 1212, which may generate artificial audio-visual responses to simulate how the individual may respond to linguistic inputs based on the genuine audio-visual responses from the respective visual response thread 1202. Further, a GAN Unit 1210 further includes a discriminator 1214, which may discriminate between artificial audio-visual responses from the generator 1212 and genuine audio-visual responses from the respective visual response thread 1202. Further, a GAN Unit 1210 further includes a data selector 1216, which may provide test responses to the discriminator 1214, where a test response includes one of an artificial audio-visual response from the generator 1212 and a genuine audio-visual response from the respective visual response thread 1202.

Further, the network 1200 includes a multi-thread adversarial training module 1250 to adversarially train each GAN Unit 1210. A GAN Unit 1210 may be trained by positively reinforcing the discriminator 1214 (or negatively reinforcing the generator 1212) of a GAN Unit 1210 for the discriminator 1214 correctly discriminating between an artificial audio-visual response and a genuine audio-visual response. A GAN Unit 1210 may be trained by positively reinforcing the generator 1212 (or negatively reinforcing the discriminator 1214) of a GAN Unit 1210 for the discriminator 1214 failing to discriminate between an artificial audio-visual response and a genuine audio-visual response.

In some examples, however, each GAN Unit 1210 may be trained to contribute to the visual portion of an audio-visual response. In other words, some GAN Units 1210 may be dedicated to contribute to the visual portion of an audio-visual response, whereas the content of the response as determined by aspect of the individual may be determined by one or more other GAN Units 1210, or by other means.

For example, a natural language response may first be generated in response to a query. This natural language response may be used as a seed to enable GAN Units 1210 to generate the accompanying visual portions of the response.

An example method for training the network 1200 to generate a response to a query may proceed as follows. First, natural language estimation may be used to compose a text-based response to a query with the response based on the individual's past responses to queries as a target response. Next, the network 1200 may generate an artificial audio-visual response. The audio-visual response may be transcribed into text, and compared to the target response. Finally, any discrepancies in the text between the artificial response and the target response may be measured and used to positively or negatively reinforce the network 1200, such that the target response is used as a rule to train the GAN Units 1210.

FIG. 13 is a schematic diagram depicting an example system 1300 for generating an interactive audio-visual representation of an individual. In the present example, the individual includes a customer service representative who is knowledgeable and skilled at interacting with potential customers at a retail establishment.

The system 1300 includes an audio-visual representation generator 1301 to obtains audio-visual data of the individual communicating responses to prompts, such as queries from potential customers and recorded responses from the individual stored in a database 1380, and analyzes the audio-visual data, as described herein. The generator 1301 receives a linguistic input, such as a query from a potential customer, made to a media device 1395, which may be located at the retail establishment, and which includes appropriate display and communication means to allow potential customers to interact with an audio-visual representation of the individual, as discussed herein. The generator 1301 communicates over the network 1370 to receive the linguistic input, and generates an audio-visual response to the linguistic input based on analysis of the audio-visual data and the linguistic input, to be output to the media device 1395 as media 1308, to simulate the individual communicating a response to the linguistic input, as described herein.

The audio-visual representation generator 1301, database 1380, network 1370, media device 1395, and media 1308, may be similar to the audio-visual representation generator 401, database 480, network 470, media device 495, and playback 408 of the system of 400, and thus further description of the above elements may be had with reference to the system 400 of FIG. 4.

Thus, the generator 1301 may be used to provide an interactive conversation experience with a representation of a customer service representative, a skilled professional such as a doctor, or a psychologist, or other profession in which, similarly a genuine representation of the individual may be beneficial.

Thus, a system may be provided which generates an audio-visual representation of an individual which responds and appears genuine based on an analysis of audio-visual data of the individual communicating responses to prompts. The audio-visual data may be segmented and resequenced and played back as a response, or used by a machine learning model which has been trained on the audio-visual data to generate artificial responses which simulate how the individual may respond. Multi-thread recording devices may be used to capture a plurality of visual threads of the individual which may be used to generate an interactive augmented reality or virtual reality representation of the individual.

Thus, an audio-visual representation of an individual may be generated which responds and appears genuine since the raw data used to generate the representation is genuine to the individual. The system may be used to converse with representations of deceased family members, celebrities, historical figures, customer service representatives, professionals, or any other representations of individuals.

Persons skilled in the art will appreciate that there are yet more alternative examples and modifications possible, and that the above examples are only illustrations of one or more examples. The scope, therefore, is only to be limited by the claims appended hereto.

The invention claimed is:

1. A system for generating an interactive audio-visual representation of an individual, the system comprising:
   a memory storage unit to store a plurality of audio-video recordings of an individual communicating responses to prompts;
   a recording analyzer to segment the plurality of audio-video recordings into a plurality of audio-video segments according to topics referenced in the responses or the prompts;
   a communication interface to receive a linguistic input;
   a recording processor to analyze the linguistic input and generate one or more responsive audio-video segments from the plurality of audio-video segments to be provided in response to the linguistic input; and
   an audio-visual media generator to generate a playback of the one or more responsive audio-video segments as an audio-visual representation of the individual responding to the linguistic input;
   wherein the recording processor comprises a machine learning model to select one or more responsive audio-video segments from the plurality of audio-video segments to simulate how the individual may respond to the linguistic input;
   wherein the machine learning model comprises a generative adversarial network adversarially trained to select one or more responsive audio-video segments from the plurality of audio-video segments to simulate how the individual may respond to linguistic inputs, wherein the generative adversarial network comprises:
   a generator to generate artificial audio-visual responses to simulate how the individual may respond to linguistic inputs;
   a discriminator to discriminate between artificial audio-visual responses from the generator and genuine audio-visual responses;
   a data selector to provide test responses to the discriminator, a test response comprising one of an artificial audio-visual response from the generator and a genuine audio-visual response; and
   an adversarial training module to adversarially train the generative adversarial network by positively reinforcing the discriminator or negatively reinforce the generator for the discriminator correctly discriminating between an artificial audio-visual response and a genuine audio-visual response, or by positively reinforcing the generator or negatively reinforce the discriminator for the discriminator failing to correctly discriminate between an artificial audio-visual response and a genuine audio-visual response.

2. The system of claim 1, wherein the one or more responsive audio-video segments comprises a plurality of responsive audio-video segments, the recording processor comprises a video segment resequencer, and wherein the recording processor generates the plurality of responsive audio-video segments at least in part by the video segment resequencer selecting and resequencing a plurality of selected responsive audio-video segments from the plurality of audio-video segments.

3. The system of claim 1, wherein:
   the recording analyzer comprises a video segment labeler to generate keyword labels for the audio-video segments indicating topics covered in the audio-video segments;
   the communication interface comprises an input labeler to generate keyword labels for the linguistic input; and
   the recording processor generates the one or more responsive audio-video segments by matching keyword labels of the audio-video segments with keyword labels of the linguistic input.

4. The system of claim 3, wherein the linguistic input comprises an auditory input, and wherein the communication interface comprises a text transcriber to transcribe the auditory input into a text input, and wherein the input labeler generates keyword labels for the linguistic input by generating keyword labels for the input text.

5. The system of claim 1, wherein the recording processor comprises a natural language processor to determine a meaning of the linguistic input.

6. The system of claim 1, wherein the playback comprises an audio-video compilation of the one or more responsive audio-video segments.

7. The system of claim 1, wherein the plurality of audio-video recordings comprises a plurality of video recording threads, each respective video recording thread captured by a different respective video recording device, and wherein the playback comprises an augmented reality representation generated with the one or more responsive audio-video segments.

8. The system of claim 1, wherein the plurality of audio-video recordings comprises a plurality of video recording threads, each respective video recording thread captured by a different respective recording device, and wherein the playback comprises a virtual reality representation generated with the one or more responsive audio-video segments.

9. The system of claim 1, wherein a prompt of the prompts includes a question to elucidate an aspect of personality of the individual.

10. A system for generating an interactive audio-visual representation of an individual, the system comprising:
    a memory storage unit to store genuine audio-visual responses to prompts, each genuine audio-visual response comprising a segment of an audio-video recording of the individual communicating a response to a prompt;
    a communication interface to receive a linguistic input;
    a machine learning model to generate an artificial audio-visual response to the linguistic input to simulate how the individual may respond to the linguistic input, the machine learning model trained with the genuine audio-visual responses to generate artificial audio-visual responses to simulate how the individual may respond to linguistic inputs; and
    an audio-visual media generator to generate media as an audio-visual representation of the individual based on the artificial audio-visual response;
    wherein the machine learning model includes a generative adversarial network, the generative adversarial network adversarially trained with the genuine audio-visual responses to generate artificial audio-visual responses to simulate how the individual may respond to linguistic inputs, wherein the genuine audio-visual responses to prompts comprise a plurality of visual response threads, each respective visual response thread captured by a different respective recording device, and wherein the generative adversarial network comprises:
- a plurality of generative adversarial units, each generative adversarial unit linked to a different respective visual response thread, each respective generative adversarial unit comprising:
  - a generator to generate artificial audio-visual responses to simulate how the individual may respond to linguistic inputs based on the genuine audio-visual responses from the respective visual response thread;
  - a discriminator to discriminate between artificial audio-visual responses from the generator and genuine audio-visual responses from the respective visual response thread; and
  - a data selector to provide test responses to the discriminator, a test response comprising one of an artificial audio-visual response from the generator and a genuine audio-visual response from the respective visual response thread; and
- a multi-thread adversarial training module to adversarially train each generative adversarial unit by positively reinforcing the discriminator or negatively reinforce the generator of a respective generative adversarial unit for the discriminator correctly discriminating between an artificial audio-visual response and a genuine audio-visual response, or by positively reinforcing the generator or negatively reinforce the discriminator of a respective generative adversarial unit for the discriminator failing to discriminate between an artificial audio-visual response and a genuine audio-visual response.

11. A system for generating an interactive audio-visual representation of an individual, the system comprising:
- a memory storage unit to store a plurality of audio-video recordings of an individual communicating responses to prompts;
- a recording analyzer to segment the plurality of audio-video recordings into a plurality of audio-video segments according to topics referenced in the responses or the prompts;
- a communication interface to receive a linguistic input;
- a recording processor to analyze the linguistic input and generate one or more responsive audio-video segments from the plurality of audio-video segments to be provided in response to the linguistic input; and
- an audio-visual media generator to generate a playback of the one or more responsive audio-video segments as an audio-visual representation of the individual responding to the linguistic input;
- wherein the recording processor comprises a machine learning model to select one or more responsive audio-video segments from the plurality of audio-video segments to simulate how the individual may respond to the linguistic input;
- wherein the machine learning model comprises a generative adversarial network adversarially trained to select one or more responsive audio-video segments from the plurality of audio-video segments to simulate how the individual may respond to linguistic inputs, wherein the audio-video recordings comprise a plurality of visual response threads, each respective visual response thread comprising a genuine audio-visual response to a prompt, each respective visual response thread captured by a different respective recording device, and wherein the generative adversarial network comprises:
  - a plurality of generative adversarial units, each generative adversarial unit linked to a different respective visual response thread, each respective generative adversarial unit comprising:
    - a generator to generate artificial audio-visual responses to simulate how the individual may respond to linguistic inputs based on the genuine audio-visual responses from the respective visual response thread;
    - a discriminator to discriminate between artificial audio-visual responses from the generator and genuine audio-visual responses from the respective visual response thread; and
    - a data selector to provide test responses to the discriminator, a test response comprising one of an artificial audio-visual response from the generator and a genuine audio-visual response from the respective visual response thread; and
  - a multi-thread adversarial training module to adversarially train each generative adversarial unit by positively reinforcing the discriminator or negatively reinforce the generator of a respective generative adversarial unit for the discriminator correctly discriminating between an artificial audio-visual response and a genuine audio-visual response, or by positively reinforcing the generator or negatively reinforce the discriminator of a respective generative adversarial unit for the discriminator failing to discriminate between an artificial audio-visual response and a genuine audio-visual response.

12. A system for generating an interactive audio-visual representation of an individual, the system comprising:
- a memory storage unit to store genuine audio-visual responses to prompts, each genuine audio-visual response comprising a segment of an audio-video recording of the individual communicating a response to a prompt;
- a communication interface to receive a linguistic input;
- a machine learning model to generate an artificial audio-visual response to the linguistic input to simulate how the individual may respond to the linguistic input, the machine learning model trained with the genuine audio-visual responses to generate artificial audio-visual responses to simulate how the individual may respond to linguistic inputs; and
- an audio-visual media generator to generate media as an audio-visual representation of the individual based on the artificial audio-visual response;
- wherein the machine learning model includes a generative adversarial network, the generative adversarial network adversarially trained with the genuine audio-visual responses to generate artificial audio-visual responses to simulate how the individual may respond to linguistic inputs, wherein the generative adversarial network comprises:
  - a generator to generate artificial audio-visual responses to simulate how the individual may respond to linguistic inputs;
  - a discriminator to discriminate between artificial audio-visual responses from the generator and genuine audio-visual responses;
  - a data selector to provide test responses to the discriminator, a test response comprising one of an artificial audio-visual response from the generator and a genuine audio-visual response; and an adversarial training module to adversarially train the generative adversarial network by positively reinforcing the discriminator or negatively reinforce the generator for the discriminator correctly discriminating between an artificial audio-visual response and a genuine audio-visual response, or by positively reinforcing the generator or negatively reinforce the discriminator for the discriminator failing to correctly discriminate between an artificial audio-visual response and a genuine audio-visual response.

* * * * *